United States Patent [19]
Yoldas

[11] Patent Number: 5,911,658
[45] Date of Patent: Jun. 15, 1999

[54] METHOD FOR PRODUCING SILICA AEROGEL UNDER SUBCRITICAL CONDITIONS

[75] Inventor: Bulent E. Yoldas, Pittsburgh, Pa.

[73] Assignee: PPG Industries Ohio, Inc., Cleveland, Ohio

[21] Appl. No.: 08/927,843

[22] Filed: Sep. 11, 1997

Related U.S. Application Data

[62] Division of application No. 08/539,461, Oct. 5, 1995, Pat. No. 5,746,992, which is a continuation of application No. 08/267,687, Jun. 28, 1994, abandoned, which is a continuation-in-part of application No. 08/174,951, Dec. 23, 1993, abandoned.

[51] Int. Cl.$^6$ ..................................................... B01J 13/00
[52] U.S. Cl. ........................... 516/101; 252/62; 423/335; 427/220; 501/12
[58] Field of Search ........................... 252/315.2; 501/12; 427/220; 516/101

[56] References Cited

U.S. PATENT DOCUMENTS

| | | | |
|---|---|---|---|
| 2,249,767 | 7/1941 | Kistler | 423/338 |
| 3,672,833 | 6/1972 | Teichner et al. | 423/338 |
| 3,810,843 | 5/1974 | Slusarczuk et al. | 252/315.2 X |
| 4,022,152 | 5/1977 | Laufer et al. | 427/220 |
| 4,386,016 | 5/1983 | Scholten | 423/338 |
| 4,402,927 | 9/1983 | von Dardel et al. | 423/335 |
| 4,432,956 | 2/1984 | Zarzycki et al. | 501/12 X |
| 4,649,037 | 3/1987 | Marsh et al. | 423/628 |
| 4,816,499 | 3/1989 | Nomura et al. | 252/315.2 X |
| 4,842,837 | 6/1989 | Shimizu et al. | 423/335 |
| 5,013,585 | 5/1991 | Shimizu et al. | 427/220 |
| 5,185,037 | 2/1993 | Kaijou | 501/12 X |
| 5,264,197 | 11/1993 | Wang et al. | 423/338 |
| 5,275,796 | 1/1994 | Tillotson et al. | 423/338 |
| 5,316,695 | 5/1994 | Wilkes et al. | 252/315.2 X |
| 5,565,142 | 10/1996 | Deshpande et al. | 501/12 X |
| 5,674,624 | 10/1997 | Miyazaki et al. | 252/315.2 X |

FOREIGN PATENT DOCUMENTS

| | | | |
|---|---|---|---|
| 784392 | 11/1954 | United Kingdom | 423/338 |
| 1183326 | 2/1967 | United Kingdom . | |

*Primary Examiner*—Richard D. Lovering
*Attorney, Agent, or Firm*—George D. Morris

[57] ABSTRACT

Liquid comprising from 93 to 100 percent by weight alcohol is removed from silica alcogel at subcritical temperature to produce silica aerogel. The silica aerogel produced by the method of the present invention not only has high porosity, but in most instances it also has a narrow distribution of small pore sizes. The silica aerogel is preferably reduced in size so as to form particulate silica aerogel.

1 Claim, No Drawings

METHOD FOR PRODUCING SILICA AEROGEL UNDER SUBCRITICAL CONDITIONS

CROSS-REFERENCE TO RELATED APPLICATION

This is a division of application Ser. No. 08/539,461, filed on Oct. 5, 1995 and now U.S. Pat. No. 5,746,992, which is a continuation of application Ser. No. 08/267,687, filed Jun. 28, 1994, abandoned, which is a continuation-in-part of application Ser. No. 08/174,951, filed Dec. 23, 1993, abandoned.

BACKGROUND OF THE INVENTION

Silica gel may be described as a coherent, rigid three-dimensional polymeric network of contiguous particles of colloidal silica. Silica gel is formed in a liquid medium, usually water, alcohol, or a mixture thereof. The terms "silica aquagel" and "silica alcogel" describe silica gels in which the pores are filled with liquid, the predominant component(s) being water or alcohol(s) as the case may be. Silica aquagel is also known as "silica hydrogel."

A "silica xerogel" is a silica gel from which the liquid medium has been removed and replaced by a gas, the structure being compressed and the porosity reduced significantly by the surface tension forces as the liquid is removed. As soon as liquid begins to evaporate from a gel at temperatures below the critical temperature, surface tension creates concave menisci in the gel's pores. As evaporation continues, the menisci retreat into the gel body, compressive forces build up around its perimeter, and the perimeter contracts drawing the gel body inward. Eventually surface tension causes significant collapse of the gel body and a reduction of volume, often as much as two-thirds or more of the original volume. This shrinkage has an important consequential effect, namely, it causes a significant reduction in the porosity, often as much as 90 to 95 percent depending on the system and pore sizes.

A "silica aerogel" is a silica gel from which the liquid has been removed in such a way as to prevent significant collapse or change in the structure as liquid is removed. Specifically, this has been done by heating the liquid-filled gel, usually a silica alcogel, in an autoclave while maintaining the prevailing pressure above the vapor pressure of the liquid until the critical temperature of the liquid has been exceeded, and then gradually releasing the vapor, usually by gradually reducing the pressure either incrementally or continuously, while maintaining the temperature above the critical temperature. The critical temperature is the temperature above which it is impossible to liquify a gas no matter how great a pressure is applied. At temperatures above the critical temperature, the distinction between liquid and gas phases disappears and so does their interface. In the absence of an interface between liquid and gas phases, there is no surface tension and hence menisci do not form. There are accordingly no surface tension forces to collapse the gel to a small volume compared with the original gel. Such a process may be termed "supercritical drying."

Silica aerogels produced by supercritical drying have high porosities, on the order of from 50 to 99 percent by volume. The remaining few percent is a continuous silica skeleton.

A major problem with the supercritical drying process is that autoclaves capable of withstanding considerable pressures are required. For example, the critical pressure (i.e., the pressure at the critical temperature) of methanol is about 8.0 MPa while that of ethanol is about 6.4 MPa. Large autoclaves are exceedingly expensive, so most silica aerogel articles and/or batches tend to be small in size.

THE PROCESS

It has now been surprisingly found that silica aerogels having high porosities can be produced from silica alcogels at subcritical temperatures. Such a process may be termed "subcritical drying."

Accordingly, one embodiment of the invention is a method comprising: (a) reacting alkyl orthosilicate selected from the group consisting of tetramethyl orthosilicate, tetraethyl orthosilicate, and a mixture thereof, with water in the absence of hydrofluoric acid to form a gel having pores wherein: (1) the reaction is conducted in the presence of a liquid phase comprising water and organic solvent which is miscible with water and the alkyl orthosilicate, (2) the initial weight ratio of the water to the alkyl orthosilicate in the liquid phase is in the range of from 1.5:1 to 4:1, (3) the initial weight ratio of the organic solvent to the alkyl orthosilicate in the liquid phase is in the range of from 0.4:1 to 6:1, and (4) the gel contains residual liquid in the pores thereof; and (b) removing the residual liquid from the gel at subcritical temperature to produce silica aerogel characterized by: (1) an internal particle pore diameter at the maximum of the dV/dlog(D) desorption pore volume plot in the range of from 7 to 20 nanometers, (2) a full width at one-third maximum of less than 15 nanometers, and (3) an internal particle porosity of at least 68 percent by volume. When residual liquid comprising the organic solvent and alcohol produced during the hydrolysis of the alkyl orthosilicate is evaporated from a silica alcogel at subcritical temperature, it is found that the porosity of the resulting silica aerogel is high, ordinarily at least 68 percent by volume, which represents only a small shrinkage of the gel. The reason for such small shrinkages is not known. Although the process is more nearly akin to that for producing silica xerogels than the supercritical method traditionally used for producing silica aerogels, the properties of the product are more nearly characteristic of the silica aerogels than the silica xerogels. For this reason the products are referred to herein and in the claims as "silica aerogels."

A considerable variety of organic solvents may be used. Examples of organic solvents that may be used include n-propanol, isopropanol, n-butanol, isobutanol, sec-butanol, tert-butanol, acetone, diacetone alcohol, methanol, ethanol, tributylamine, diethyl ketone, and a mixture thereof.

The reaction of alkyl orthosilicate with water may be conducted while the reaction mixture is allowed to stand quiescently, or it may be conducted while the reaction mixture is agitated, as for example by stirring.

The temperature at which the residual liquid is removed is below the critical temperature of the residual liquid of the silica alcogel. Usually the temperature is in the range of from 0° C. to 250° C. In many cases the temperature is in the range of from 20° C. to 80° C. Preferably the temperature is in the range of from 40° C. to 80° C.

The pressure at which the residual liquid is removed may be widely varied. The pressure may be superatmospheric, ambient atmospheric, or subatmospheric. Usually, but not necessarily, the pressure is subcritical. Conceivably, supercritical pressures could be used while the temperature is subcritical by pressurizing with inert gas. Preferably the pressure is ambient atmospheric pressure.

An advantage of the process includes the ability to eliminate use of an autoclave. It should be recognized, however, that the process of the invention can be practiced in an autoclave when desired.

THE PREFERRED PROCESS

It has also been discovered that preferred silica aerogels having high porosities can be produced from silica alcogels at subcritical temperatures if the liquid to be removed from the silica alcogel comprises from 93 to 100 percent by weight alcohol and the alcohol comprises at least 25 percent by weight isopropanol [CAS 67-63-0].

Accordingly, the preferred embodiment of the invention is a method comprising removing liquid comprising from 93 to 100 percent by weight alcohol wherein the alcohol comprises at least 25 percent by weight isopropanol, from silica alcogel at subcritical temperature to produce silica aerogel. In most cases the liquid is removed by evaporation.

Optionally, but not necessarily, some or all of the alcohol of the silica alcogel as first formed may be replaced with isopropanol by soaking the alcogel in isopropanol. The liquid may then be removed from the silica alcogel so modified under subcritical temperature conditions.

The liquid in the pores of the silica alcogel comprises from 93 to 100 percent by weight alcohol. A minor amount of one or more other volatile liquids, as for example, water, may also be present. The alcohol may be pure isopropanol or it may comprise isopropanol and one or more other alcohols including but not limited to methanol and ethanol. Often the liquid comprises from 95 to 100 percent by weight alcohol. Preferably the liquid comprises from 98 to 100 percent by weight alcohol.

The alcohol of the liquid comprises at least 25 weight percent isopropanol. In many cases the alcohol comprises at least 35 weight percent isopropanol. At least 45 weight percent isopropanol is preferred.

Often, the alcohol of the liquid of the alcogel comprises a mixture of isopropanol and methanol [CAS 67-56-1]. In such cases the weight ratio of isopropanol to methanol may be widely varied but usually it is in the range of from 0.5:1 to 3:1. Frequently the weight ratio of isopropanol to methanol is in the range of from 0.7:1 to 1:1. From 0.9:1 to 1.1:1 is preferred.

THE SILICA AEROGEL PRODUCT

The silica aerogel produced by the subcritical process of the invention is characterized by an internal particle porosity of at least 68 percent by volume. Usually the silica aerogel is also characterized by an internal particle pore diameter at the maximum of the dV/dlog(D) desorption pore volume plot in the range of from 7 to 20 nanometers and a full width at one-third maximum of less than 15 nanometers.

The skeleton of the silica alcogel and hence of the silica aerogel may be pure silica or it may comprise silica and minor amounts of one or other materials including but not limited to alumina, zirconia, titania, iron oxide, and the like. Usually silica constitutes at least 65 weight percent of the skeleton. Often silica constitutes at least 80 weight percent of the skeleton. At least 90 weight percent silica is preferred.

The pores of the silica aerogel contain gas, or if the gas is removed, a vacuum.

Silica aerogel has various uses including use as a detector for Cerenkov radiation. A use of particular interest and importance, however, is as a thermal insulator.

The total thermal conductivity of a porous material is the sum of the conductivity through the solid phase, the conductivity through the gas phase, and conductivity due to transfer by radiation. The effect of convection of the gas trapped in the pores is negligible and can be completely ignored in aerogels; therefore:

$$\lambda_t = \lambda_s + \lambda_g + \lambda_r$$

where:
- $\lambda_t$ is the total thermal conductivity of the aerogel;
- $\lambda_s$ is the thermal conductivity through the solid of the aerogel;
- $\lambda_g$ is the thermal conductivity through the gas of the aerogel; and
- $\lambda_r$ is the thermal conductivity due to transfer by radiation.

It can be shown that $\lambda_s$ is inversely proportional to the pore fraction. Consequently, larger porosities favor lower solid conductivities. It can also be shown that for pore sizes below the mean free path for the gas molecules in the pores, $\lambda_g$ is directly proportional to both pore fraction and pore size.

In cases where pore sizes are below the mean free path, reducing either the porosity or the pore size reduces the gas conductivity. The important observation is that a reduction of porosity also results in an increase in the thermal conductivity through the solid, whereas a reduction of the pore size does not provide such a penalty. Thus the most effective way to reduce the total conduction while using the same materials, is to reduce the pore size. Restated, to achieve high thermal insulating properties, a small pore size should accompany a high porosity.

The silica aerogel produced by the method of the present invention not only has high porosity, but in most instances, it also has a narrow distribution of small pore sizes.

The difficulty in concurrently obtaining small pore sizes and high porosity may be illustrated by the capillary pressure equation:

$$p = 2\gamma \cos \theta / r$$

where:
- p is the capillary pressure;
- $\gamma$ is the surface tension;
- $\theta$ is the contact angle of the liquid surface with the capillary wall; and
- r is the radius of the capillary pore.

It will be observed that capillary pressures at pore diameters of from 7 to 20 nanometers are enormous. Therefore, the concurrent attainment of both such large porosities and such small pore diameters as are characteristic of the silica aerogels of the present invention, is wholly unexpected.

For the silica aerogels produced by the subcritical method of the present invention, the pore diameter at the maximum of the dV/dlog(D) desorption pore volume plot is in the range of from 7 to 20 nanometers. Frequently the pore diameter at the maximum of the dV/dlog(D) desorption pore volume plot is in the range of from 8 to 15 nanometers. Preferably the pore diameter at the maximum of the dV/dlog(D) desorption pore volume plot is in the range of from 9 to 12 nanometers.

As used herein and in the claims, the pore diameter at the maximum of the dV/dlog(D) desorption pore volume plot is determined using a Micromeritics Model ASAP 2400 Accelerated Surface Area and Porosimetry Instrument (Micromeritics Instrument Corporation) in accordance with the accompanying operating manual in which the following choices and modifications are followed: (a) samples are prepared by drying for one hour at 160° C., (b) a five point BET surface area is selected, (c) a dried sample weight of approximately 0.2 gram is used, (d) a degas temperature of 160° C. is used, (e) total degassing time is one hour ±5 minutes, (f) the default value in which five partial pressures between 0.05 and 0.2 are selected by the instrument software is chosen, (g) 15 micropore points and total pore volume are selected, (h) 10 adsorption points are used, (i) 10 desorption points are used, (j) the BET surface area is reported by the instrument, (k) the average pore diameter by BET is reported by the instrument, (1) the BJH cumulative desorption pore volume of pores is reported by the instrument, and (m) the dV/dlog(D) desorption pore volume plot is made by the instrument. Once the dV/dlog(D) desorption pore volume plot has been made, the pore diameter at the maximum of the dV/dlog(D) desorption pore volume plot is ascertained.

The full width at one-third maximum of the silica aerogel produced by the method of the present invention is less than 15 nanometers. Often the full width at one-third maximum is less than 10 nanometers. Preferably the full width at one-third maximum is less than 8 nanometers.

As used herein and in the claims, the full width at one-third maximum is found from the dV/dlog(D) desorption pore volume plot determined as described above. The maximum value of the incremental pore volume is first ascertained from the plot. The full width of the plotted function at one third of the maximum value is then obtained. The width is denoted "full width" to indicate that the width is not corrected for the effects of other peaks which may be superimposed on the main peak.

The internal particle porosities of the silica aerogels produced by the method of the present invention are not as high as those of the highest porosity silica aerogels produced by supercritical drying. Nevertheless the internal particle porosities are considerably higher than those of the usual silica xerogels. The internal particle porosity of the silica aerogel produced by the method of the present invention is at least 68 percent by volume. Often the internal particle porosity is at least 70 percent by volume. Preferably the internal particle porosity is at least 75 percent by volume. Usually the internal particle porosity is in the range of from 68 to 82 percent by volume. In many cases the internal particle porosity is in the range of from 70 to 82 percent by volume. Frequently the internal particle porosity is in the range of from 75 to 82 percent by volume.

As used herein and in the claims, internal particle porosity is determined according to the equation:

$$P = \frac{V}{V + 0.45} \times 100$$

where:

P is the internal particle porosity of the silica aerogel, expressed as percent by volume, and V is the BJH cumulative desorption pore volume of pores determined using a Micromeritics Model ASAP 2400 Accelerated Surface Area and Porosimetry Instrument as described above, expressed as $cm^3/g$.

The internal particle porosity of the aerogel produced according to the process of the invention may optionally be further increased by heating the aerogel at elevated temperatures such as 400° C. or higher.

Particulate silica aerogel is an especially useful form of silica aerogel, whether made subcritically or supercritically. The silica aerogel may be reduced in size so as to form particulate silica aerogel, especially silica aerogel powder. Any known technique of size reduction may be used including grinding, pulverizing, shattering, or micronizing.

In fluid energy mills, which are themselves well known, the solid particles are suspended in a gas stream and conveyed at high velocity in a circular or elliptical path. Some reduction occurs when the particles strike or rub against the walls of the confining chamber, but most of the reduction is believed to be caused by interparticle attrition. See, for example, *Perry's Chemical Engineers'Handbook*, 4th Edition McGraw-Hill Book Company, New York, (1963), Library of Congress Catalog Card Number 6113168, pages 8–42 and 8–43; McCabe and Smith, *Unit Operations of Chemical Engineering*, 3rd Edition, McGraw-Hill Book Company, New York (1976), ISBN 0-07-044825-6, pages 844 and 845; F. E. Albus, "The Modern Fluid Energy Mill", *Chemical Engineering Progress*, Volume 60, No. 6 (June 1964), pages 102–106.

Containers of particulate silica aerogel are especially useful as thermal insulation. Particulate silica aerogel is also especially useful as an ingredient in rigid, substantially closed cell, polyurethane foams. Another use for particulate silica aerogel is as an additive to polymers and to paints for both thermal insulation and weight reduction.

Accordingly, another embodiment of the invention is particles of silica aerogel wherein the particles are collectively characterized by an internal particle porosity of at least 68 percent by volume and wherein at least 90 percent by weight of the particles have sizes of 25 micrometers or less. Usually the particles are also collectively characterized by an internal particle pore diameter at the maximum of the dV/dlog(D) desorption pore volume plot in the range of from 7 to 20 nanometers, a full width at one-third maximum of less than 15 nanometers, and a bulk porosity of at least 85 percent by volume.

The internal particle pore diameter at the maximum of the dV/dlog(D) desorption pore volume plot, the full width at one-third maximum, and the internal particle porosity are as discussed above in respect of the silica aerogel made by the subcritical process of the invention.

The bulk porosity of the particulate silica aerogel of the invention is at least 85 percent by volume. Preferably the bulk porosity is at least 90 percent by volume. As used herein and in the claims, the bulk porosity is determined by the following procedure: A 1000 cubic centimeter container is filled with silica aerogel. The filling is accomplished by tapping the container on a table top several times as the filling progresses and finally raking off the excess using a straight edge. The weight of the silica aerogel in the container is ascertained. The bulk porosity is found according to the equation:

$$B = 100 - \frac{w}{22}$$

where:

B is the bulk porosity of the silica aerogel, expressed as percent by volume, and w is the weight of the 1000 $cm^3$ sample of the silica aerogel, expressed as grams.

At least 90 percent by weight of the silica aerogel particles of the invention has sizes of 25 micrometers or less. It is preferred that at least 90 percent by weight of the particles have sizes of 10 micrometers or less. As used herein and in the claims, the sizes of the particles are determined by use of a Multisizer II Coulter counter (Coulter Electronics, Inc.) according to ASTM C 690-86 but modified by stirring the silica aerogel for 10 minutes in Isoton II electrolyte (Curtin Matheson Scientific, Inc.) using a four blade, 4.5 centimeter diameter propeller stirrer.

The surface area of the silica aerogel of the present invention may vary widely. In most, but not necessarily all, cases the surface area is in the range of from 400 to 1000 $m^2/g$. Often the surface area is in the range of from 500 to 800 $m^2/g$. From 500 to 700 $m^2/g$ is preferred. As used herein and in the claims, the surface area of the silica aerogel is the BET surface area determined using a Micromeritics Model ASAP 2400 Accelerated Surface Area and Porosimetry Instrument as described above, expressed as $m^2/g$.

Terminal groups of the silica may be hydroxyl (i.e., silanol) groups or organooxy groups (such as alkoxy, phenoxy, methylphenoxy, etc.) in various proportions. The identities and relative proportions are determined by the relative amount of water used to induce hydrolysis during alcogel preparation, the presence of reactants to form differing terminal groups during formation of the alcogel, and the nature of the aftertreatment(s), if any, of the alcogel or aerogel. The greater the amount of water used during hydrolysis, the greater the proportion of hydroxyl terminal groups; however, if more than about 2.5 moles of water per mole of alkyl orthosilicate is used, the porosity of the gel produced is diminished. The terminal groups of the silica aerogel may be modified by reaction with one or more compounds, whether liquid or vapor without affecting porosity, pore size, or pore morphology. Often the modification is to provide organo-functional terminal groups to the silica aerogel. For example, aerogels having terminal hydroxyl groups may be exposed to chlorotrimethylsilane [CAS 75-77-4] vapor, to trimethylmethoxysilane [CAS 1825-61-2] vapor and ammonia catalyst, or to trimethylethoxysilane [CAS 1825-62-3] and ammonia catalyst to convert some or all of the hydroxyl groups to trimethylsilyloxy groups. Similarly, aerogels having terminal hydroxyl groups may be exposed to chloromethoxydimethylsilane [CAS 1825-68-9] vapor to convert some or all of the hydroxyl groups to hydrophobic groups. Silica aerogel is preferably rendered hydrophobic by exposure to trimethylmethoxysilane [CAS 1825-61-2] and ammonia catalyst. Treatment of silica aerogel with trimethylmethoxysilane and ammonia vapor catalyst at 50° C. produces a hydrophobic silica aerogel suitable for use with hydrophobic surfactants in polyurethane foams to improve thermal insulation value. In some instances it is desired to increase the numbers of hydroxyl groups on the silica aerogel prior to conversion of hydroxyl groups to hydrophobic groups. This may be accomplished by exposing the silica aerogel to water vapor in the presence of a catalyst such as ammonia, to convert some or all of the pendent alkoxy groups to hydroxyl groups. Treatment to convert hydroxyl groups to hydrophobic groups can then be effectuated as described above.

Silica aerogel having organo-functional terminal groups may be heated to from 3000° C. to 4000° C. to cause elemental carbon deposition on the surface of the aerogel. Such deposition is accompanied by a change in the color of the silica aerogel to grey or black.

Silica alcogels from which the aerogels of the present invention are formed may be produced by hydrolyzing tetramethoxysilane [CAS 681-84-5] with water in the presence of organic solvent which is miscible with water and the tetramethoxysilane and in the presence of basic catalyst. Preferably the organic solvent is at least one alcohol.

The amount of water used may be varied. In most cases the molar ratio of water to the tetramethoxysilane initially present is in the range of from 1.5:1 to 4:1. Frequently the molar ratio is in the range of from 2:1 to 3.5:1. From 2:1 to 2.3:1 is preferred.

The organic solvent which is miscible with water is preferably alcohol. The alcohol employed is preferably isopropanol, but other lower alcohols or mixtures of lower alcohols may be used. The amount of organic solvent which is miscible with water used may be varied considerably, but usually the weight ratio of the organic solvent which is miscible with water to the tetramethoxysilane or tetraethoxysilane initially present is in the range of from 0.4:1 to 6:1. Often the weight ratio is in the range of from 0.5:1 to 4:1. From 0.7:1 to 2:1 is preferred.

Any of various basic catalysts may be used. Examples of suitable basic catalysts include ammonium hydroxide, ammonium fluoride, and urea. The amount of basic catalyst employed is widely variable, but usually a catalytic amount, ordinarily from 0.00001 to 0.1 equivalents of basic catalyst per mole of tetramethoxysilane initially present is used. Often from 0.0001 to 0.06 equivalents of basic catalyst per mole of tetramethoxysilane initially present is used. From 0.001 to 0.02 equivalents of basic catalyst per mole of tetramethoxysilane initially present is preferred. In the case of a catalyst which is in equilibrium with precursors, the amount of basic catalyst employed is taken as if all of the precursor had been converted to basic catalyst. For example, in an equilibrium between ammonia and water on the one hand and ammonium hydroxide on the other, the amount of basic catalyst employed is taken as the amount of ammonium hydroxide (irrespective of the degree of ionization) which would be formed if all ammonia were converted by reaction with water to ammonium hydroxide.

The tetramethoxysilane, water, organic solvent which is miscible with water, and basic catalyst may be mixed in the container in which they are to be reacted which is then closed, or the ingredients may be mixed in another container and then introduced to the container in which they are to be reacted which is then closed.

Similarly, the silica alcogels may be produced by hydrolyzing tetraethoxysilane [CAS 78-10-4] with water in two steps in the presence of organic solvent which is miscible with water and the tetraethoxysilane and in the presence of catalyst. In the first step partial hydrolysis is conducted in the presence of acidic catalyst, while in the second step the hydrolysis is conducted in the presence of a basic catalyst.

The amount of water used in the first step may be varied. In most cases the molar ratio of water to the tetraethoxysilane initially present in the first step is in the range of from 0.5:1 to 1:1. From 0.7:1 to 0.9:1 is preferred.

Any of various acidic catalysts may be used. Examples of suitable acidic catalysts include hydrochloric acid, nitric acid, and perchloric acid. The amount of acidic catalyst employed is widely variable, but usually a catalytic amount, ordinarily from 0.001 to 0.005 equivalents of acidic catalyst per mole of tetraethoxysilane initially present is used. From 0.002 to 0.003 equivalents of acidic catalyst per mole of tetraethoxysilane initially present is preferred.

Any of the organic solvents which are miscible with water as described above may be used in the first step. Usually the organic solvent is alcohol. Methanol is preferred. The amount of organic solvent used is at least sufficient to render the tetraethoxysilane miscible with the water present.

Basic catalyst and additional water are added before commencing the second step hydrolysis.

The amount of water used in the second step may also be varied. In most cases the amount of water added between the first step and the second step is such that the the molar ratio of the water employed in both steps to the tetraethoxysilane initially present in the first step is in the range of from 0.5:1 to 1:1. From 0.7:1 to 0.9:1 is preferred.

Any of various basic catalysts may be used. Examples of suitable basic catalysts are those described above in respect of tetramethoxysilane. The amount of basic catalyst employed in the second step is widely variable. A neutralizing amount, that is, an amount which will raise the pH of the reaction mixture to 7 is first introduced. Thereafter, a catalytic amount, ordinarily from 0.00001 to 0.1 equivalents of basic catalyst per mole of tetraethoxysilane initially present in the first step is used. Often from 0.0001 to 0.06 equivalents of basic catalyst per mole of tetraethoxysilane initially present in the first step is used. From 0.001 to 0.02 equivalents of basic catalyst per mole of tetraethoxysilane initially present in the first step is preferred. In the case of a catalyst which is in equilibrium with precursors, the amount of basic catalyst employed is taken as if all of the precursor had been converted to basic catalyst, as described above.

When desired, a further quantity of organic solvent which is miscible with water as described above may be added before the second step. the organic solvent which is miscible with water may be the same as or different from that used in the first step. Usually the organic solvent is alcohol. Isopropanol is preferred. The amount of organic solvent which is added between the first step and the second step may be varied considerably, but usually it is such that the weight ratio of the organic solvent used in both steps to the tetraethoxysilane initially present in the first step is in the range of from 0.4:1 to 6:1. Often the weight ratio is in the range of from 0.5:1 to 4:1. From 0.7:1 to 2:1 is preferred.

The tetraethoxysilane, water, organic solvent which is miscible with water, and acidic catalyst may be mixed in the container in which they are to be reacted which is then closed, or the ingredients may be mixed in another container and then introduced to the container in which they are to be reacted which is then closed. After partial hydrolysis has occurred as evidenced by depletion of water, the container is opened and water, basic catalyst, and optionally a further quantity of organic solvent which is miscible with water, are added and the container is again closed.

Irrespective of the alkyl orthosilicate used, the temperature at which the reaction mixture is heated is in all cases below the boiling point under the prevailing pressure within the container. Generally, the temperature is in the range of from 0° C. to 250° C. In many instances the temperature is in the range of from 0° C. to 80° C. From 20° C. to 60° C. is preferred. In most cases the ingredients are heated in the closed container, usually in an oven.

The final mixture is held at the reaction temperature until the silica alcogel is formed. The reaction period may be widely varied, but usually it is in the range of from one minute to 24 hours. Often the heating period is in the range of from 20 minutes to 10 hours. Preferably the heating period is in the range of from 30 minutes to 2 hours.

Once the silica alcogel is formed, the liquid may be removed subcritically to produce the silica aerogel of the present invention as described above.

The reactions leading to silica network and gel formation can be represented (ideally) as: Hydrolysis:

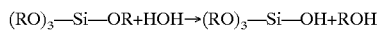

Polymerization:

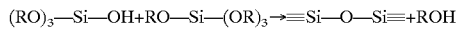

The overall ideal reaction can be represented as:

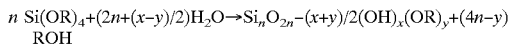

where here R is methyl or ethyl and n is a large number.

These equations show that as the reactions proceed, methanol or ethanol is generated. Therefore, the liquid of silica alcogel produced by this process will comprise methanol or ethanol. When, as is preferred, the reaction is conducted in the presence of isopropanol, the liquid of the silica alcogel produced by this process will comprise both isopropanol and either methanol or ethanol.

When desired, tetramethoxysilane or tetraethoxysilane may be hydrolyzed in the presence of one or more other reactive compounds which provide organo-functional terminal groups to the silica alcogel. The silica alcogel may then be converted to silica aerogel having organo-functional groups by removing the liquid under subcritical conditions. For example, 3-aminopropyltriethoxysilane [CAS 919-30-2] may be included with the tetramethoxysilane, water, and alcohol to form silica alcogel having organo-functional terminal groups.

The invention is further described in conjunction with the following examples which are to be considered illustrative rather than limiting, and in which all parts are parts by weight and all percentages are percentages by weight unless otherwise specified.

EXAMPLE 1

One hundred grams of tetramethoxysilane and 50 grams of isopropanol were admixed in a first container. Twenty-five grams of water, 25 grams of isopropanol, and 0.015 gram of an aqueous ammonium hydroxide solution containing 29 percent ammonia were admixed in a second container. The contents of the two containers were combined in a glass jar which was subsequently sealed with a lid. The sealed jar and its contents were placed in an air oven at 50° C. In 2 to 3 hours a monolithic alcogel had formed. The jar was unsealed and the alcogel was dried at the same temperature in the same oven by evaporation of liquid to form a clear, transparent silica aerogel having an internal particle porosity of 80 percent, a pore diameter at the maximum of the dV/dlog(D) desorption pore volume plot of 9.6 nm, and a surface area of 584 m$^2$/g. The full width at one-third maximum was 7 nm.

EXAMPLE 2

A reactor was charged with 244 grams of isopropanol, 81.25 grams of water, 0.65 gram of aqueous ammonium hydroxide solution containing 29 percent ammonia, and 325 grams of tetramethoxysilane. The reactor was sealed and stirred for 45 minutes at 50° C. Initially the rate of stirring was 150 revolutions per minute, but the rate decreased somewhat as the viscosity of the reaction mixture increased. The product was vacuum stripped for 3½ hours while stirring was continued at 50° C. The vacuum was broken with air. A vacuum of 6.2 kilopascals gauge was established. The vacuum was broken with 3.4 grams of ammonia from a lecture bottle. The vacuum take-off was replaced with a chilled water condenser. Heating of the reactor and the dropwise addition is of 32.4 grams of trimethylethoxysilane from a pressure equalized dropping funnel were begun. The temperature was stabilized at 80° C. The dropwise addition of the trimethylethoxysilane was continued until completed. The time required for the addition was 37 minutes. The product was exposed to trimethylethoxysilane vapor and ammonia vapor for 3 hours at a temperature of 80° C. The reactor was sealed, cooled to ambient temperature, and allowed to stand over a weekend. The resulting silica aerogel product had an internal particle porosity of 78 percent, pore diameter at the maximum of the dV/dlog(D) desorption pore volume plot of about 10 nm, and a surface area of 520 m$^2$/g. The product exhibited a narrow pore size distribution similar to that of the product of Example 1. When the product was micronized to particle sizes less than 6 micrometers, it retained its hydrophobicity.

EXAMPLE 3

Thirty-eight grams of tetramethoxysilane and 60 grams of methanol were admixed in a first container. Nine grams of water, 60 grams of isopropanol, and 0.05 gram of an aqueous ammonium hydroxide solution containing 29 percent ammonia were admixed in a second container. The contents of the two containers were combined in a glass jar which was subsequently sealed with a lid. The sealed jar and its contents were placed in an air oven at 50° C. After one hour the clear liquid attained a slightly blue color. In another 2 to 3 hours the solution had gelled into an alcogel which had the appearance of a solid mass. The jar was unsealed and the alcogel was dried at 50° C. in the same oven by evaporation of liquid to form a clear, transparent silica aerogel having an internal particle porosity of 81 percent, a pore diameter at the maximum of the dv/dlog(D) desorption pore volume plot of 9 nm, and a surface area of 625 m$^2$/g. The full width at one-third maximum was 4.5 nm.

EXAMPLE 4

Twenty-five grams of water, 200 grams of isopropanol, and 0.45 gram of an aqueous ammonium hydroxide solution containing 29 percent ammonia were admixed in a container. To this was added 100 grams of tetramethoxysilane. The container was sealed with a lid and placed in an air oven at 50° C. for a weekend. The container was unsealed and found to contain an alcogel. The alcogel was dried at the same temperature in the same oven by evaporation of liquid to form a clear, transparent silica aerogel having an internal particle porosity of 77 percent, a pore diameter at the maximum of the dV/dlog(D) desorption pore volume plot of 9 nm, and a surface area of 612 m$^2$/g. The full width at one-third maximum was 7 nm.

EXAMPLE 5

Fifty grams of water, 425 grams of isopropanol, and 0.5 gram of an aqueous ammonium hydroxide solution containing 29 percent ammonia were admixed in a container. To this was added 152 grams of tetramethoxysilane. The container was sealed with a lid and then placed in an air oven at 60° C. until the contents gelled to form an alcogel. The container was unsealed and the alcogel was dried by evaporation of liquid to form a clear, transparent silica aerogel having an internal particle porosity of 79 percent, a pore diameter at the maximum of the dV/dlog(D) desorption pore volume plot of 13 nm, and a surface area of 606 m$^2$/g. The full width at one-third maximum was 13 nm.

EXAMPLE 6

Thirty-seven grams of water, 60 grams of isopropanol, and 0.1 gram of an aqueous ammonium hydroxide solution containing 29 percent ammonia were admixed in a container. To this was added 152 grams of tetramethoxysilane. The container was sealed with a lid and then placed in an air oven at 60° C. until the contents gelled to form an alcogel. The container was unsealed and the alcogel was dried by evaporation of liquid to form a clear, transparent silica aerogel having an internal particle porosity of 71 percent, a pore diameter at the maximum of the dV/dlog(D) desorption pore volume plot of 9.5 nm, and a surface area of 608 m$^2$/g. The full width at one-third maximum was 6 nm.

EXAMPLE 7

Fifty grams of water, 455 grams of isopropanol, and 0.3 gram of an aqueous ammonium hydroxide solution containing 29 percent ammonia were admixed in a container. To this was added 152 grams of tetramethoxysilane. The container was sealed with a lid and then placed in an air oven at 60° C. until the contents gelled to form an alcogel. The container was unsealed and the alcogel was dried by evaporation of liquid to form a clear, transparent silica aerogel having an internal particle porosity of 79 percent, a pore diameter at the maximum of the dV/dlog(D) desorption pore volume plot of 15 nm, and a surface area of 563 m$^2$/g. The full width at one-third maximum was 12 nm.

EXAMPLE 8

Thirty-eight grams of water, 60 grams of isopropanol, and 0.1 gram of an aqueous ammonium hydroxide solution containing 29 percent ammonia were admixed in a container. To this was added 152 grams of tetramethoxysilane. The container was sealed with a lid and then placed in an air oven at 60° C. until the contents gelled to form an alcogel. The container was unsealed and the alcogel was dried by evaporation of liquid to form a clear, transparent silica aerogel having an internal particle porosity of 76 percent, a pore diameter at the maximum of the dV/dlog(D) desorption pore volume plot of 13 nm, and a surface area of 574 m$^2$/g. The full width at one-third maximum was 13 nm.

EXAMPLE 9

Fifty grams of water, 273 grams of isopropanol, and 0.1 gram of an aqueous ammonium hydroxide solution containing 29 percent ammonia were admixed in a container. To this was added 152 grams of tetramethoxysilane. The container was sealed with a lid and then placed in an air oven at 60° C. until the contents gelled to form an alcogel. The container was unsealed and the alcogel was dried by evaporation of liquid to form a clear, transparent silica aerogel having an internal particle porosity of 80 percent, a pore diameter at the maximum of the dV/dlog(D) desorption pore volume plot of 14 nm, and a surface area of 511 m$^2$/g. The full width at one-third maximum was 12 nm.

EXAMPLE 10

Seventy-five grams of isopropanol, 25 grams of water, and 0.15 gram of an aqueous ammonium hydroxide solution containing 29 percent ammonia were admixed in a container. To this was added 100 grams of tetramethoxysilane. The container was sealed with a lid and then placed in an air oven at 50° C. until the contents gelled to form an alcogel. The container was unsealed and the alcogel was dried at 50° C. by evaporation of liquid to form a clear, transparent silica aerogel having an internal particle porosity of 77 percent, a pore diameter at the maximum of the dV/dlog(D) desorption pore volume plot of 9.6 nm, and a surface area of 626 m$^2$/g. The full width at one-third maximum was 6 nm.

The aerogel was heated in a furnace to 500° C. and held at that temperature for 30 minutes and then allowed to cool. The aerogel lost about 18 percent of its weight. The dimensions of the aerogel were not much changed by the heating. The internal particle porosity was 82 percent, and the pore diameter at the maximum of the dV/dlog(D) desorption pore volume plot was 9 nm. The full width at one-third maximum was 6 nm.

EXAMPLE 11

Granules of aerogel produced in Example 1 were micronized in a fluid energy mill to produce particles of hydrophilic silica aerogel having an average size of about 3 μm. The bulk density of this powder was 0.12 g/cm³, indicating a bulk porosity of about 94 percent.

EXAMPLE 12

Fifty grams of the micronized aerogel powder produced in Example 11 was placed in a 3.8 liter (one US gallon) jar. Five grams of liquid chlorotrimethylsilane was placed in a separate small glass container. The small container containing the chlorotrimethylsilane was placed in the jar. The jar was sealed and placed in an 50° C. oven. The micronized aerogel powder was exposed overnight at 50° C. to chlorotrimethylsilane vapor which had evaporated from the liquid. The thusly treated powder was hydrophobic. The surface morphology of the powder was substantially unaffected by the treatment.

EXAMPLE 13

Three hundred seventy-five grams of isopropanol and 125 grams of water were admixed in a container. To this was added 500 grams of tetramethoxysilane. After 5 minutes, 20 grams of 3-aminopropyltriethoxysilane [CAS 919-30-2] was added. The container was sealed with a lid and then placed in an air oven at 50° C. until the contents gelled to form an alcogel. The container was unsealed and the alcogel was dried at 50° C. in the same oven by evaporation of liquid to form a clear, transparent silica aerogel having an internal particle porosity of 78 percent, a pore diameter at the maximum of the dv/dlog(D) desorption pore volume plot of 9.5 nm, and a surface area of 623 m²/g. The full width at one-third maximum was 7.5 nm.

EXAMPLE 14

A portion of the silica aerogel produced in Example 13 was heated to 200° C. to produce a black silica aerogel having an internal particle porosity of 82 percent and a pore size at the maximum of the dV/dlog(D) desorption pore volume plot of 10 nm. The full width at one-third maximum was 7.5 nm. Such an aerogel can be used to reduce radiative heat transfer.

EXAMPLE 15

Forty-two grams of tetraethoxysilane, 50 grams of methanol, 3.6 grams of water, and 0.05 gram of 70 percent nitric acid were admixed in a glass container. The container was sealed and held at 60° C. for 24 hours to produce a reaction mixture in which partial hydrolysis of the tetraethoxysilane under acidic conditions had been achieved. An additive solution was formed by admixing 50 grams of isopropanol, 3.6 grams of water, and 0.1 gram of aqueous ammonium hydroxide solution containing 29 percent ammonia. The additive solution was added in its entirety to the reaction mixture. The container was sealed and kept at 6° C. for another 24 hours to achieve secondary hydrolysis under basic conditions. A clear gel resulted. Drying of this gel at 60° C. in an oven resulted in a silica aerogel had an internal particle porosity of 74 percent, a pore diameter at the maximum of the dV/dlog(D) desorption pore volume plot of about 11.6 nm, and a surface area of 455 m²/g. The product exhibited a narrow pore size distribution similar to that of the product of Example 1 .

Although the present invention has been described with reference to specific details of certain embodiments thereof, it is not intended that such details should be regarded as limitations upon the scope of the invention except insofar as they are included in the accompanying claims.

I claim:

1. In the method wherein silica alcogel is formed by hydrolyzing tetramethoxysilane or tetraethoxysilane with water in the presence of at least one alcohol and basic catalyst, the improvement wherein:

(a) said alcohol comprises at least 25 percent by weight isopropanol, and (b) said hydrolysis is conducted in the presence of one or more other reactive compounds which comprise 3-aminopropyltriethoxysilane and which provide organo-functional terminal groups to said alcogel.

* * * * *